(12) United States Patent
Mu

(10) Patent No.: US 10,528,239 B2
(45) Date of Patent: Jan. 7, 2020

(54) DISPLAY PROCESSING METHOD, DISPLAY PROCESSING APPARATUS AND ELECTRONIC DEVICE

(71) Applicant: BOE TECHNOLOGY GROUP CO., LTD., Beijing (CN)

(72) Inventor: Xinxin Mu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 226 days.

(21) Appl. No.: 15/308,146

(22) PCT Filed: Nov. 25, 2015

(86) PCT No.: PCT/CN2015/095538
§ 371 (c)(1),
(2) Date: Nov. 1, 2016

(87) PCT Pub. No.: WO2016/184070
PCT Pub. Date: Nov. 24, 2016

(65) Prior Publication Data
US 2017/0269822 A1     Sep. 21, 2017

(30) Foreign Application Priority Data

May 15, 2015   (CN) .......................... 2015 1 0247527

(51) Int. Cl.
*G06F 3/048*     (2013.01)
*G06F 3/0484*    (2013.01)
(Continued)

(52) U.S. Cl.
CPC ........ *G06F 3/04845* (2013.01); *G06F 3/0482* (2013.01); *G06F 3/04886* (2013.01); *G06F 2203/04803* (2013.01)

(58) Field of Classification Search
CPC ......... G06F 3/0481; G06F 2203/04803; G06F 2203/04808; G06F 3/0484; G06F 3/04842;
(Continued)

(56) References Cited

U.S. PATENT DOCUMENTS 6,232,972 B1 *  5/2001  Arcuri ..................... G06F 9/453
                                                   715/815
6,621,532 B1 *  9/2003  Mandt ................... G06F 3/0482
                                                   348/841
(Continued)

FOREIGN PATENT DOCUMENTS

CN     102111497 A     6/2011
CN     102129312 A     7/2011
(Continued)

OTHER PUBLICATIONS

First Office Action for Chinese Application No. 201510247527.9, dated May 22, 2017, 12 Pages.
(Continued)

*Primary Examiner* — Wilson W Tsui
(74) *Attorney, Agent, or Firm* — Brooks Kushman P.C.

(57) ABSTRACT

A display processing method, a display processing apparatus and an electronic device are provided. The display processing method applied to an electronic device includes creating a secondary window in the touch display region, acquiring source display content corresponding to a display object displayed currently on the display screen, modifying the source display content according to a ratio of a size of the first sub-window to a size of the display screen, to obtain target display content to be mapped and displayed into the first sub-window, selecting to-be-displayed touch buttons from a set of touch buttons, the to-be-displayed touch buttons corresponding to at least one target application, and displaying the target display content and the to-be-displayed
(Continued)

touch buttons into the first sub-window and the second sub-window respectively.

13 Claims, 3 Drawing Sheets

(51) Int. Cl.
*G06F 3/0482* (2013.01)
*G06F 3/0488* (2013.01)

(58) Field of Classification Search
CPC ........ G06F 3/0486; G06F 3/14; G06F 3/1454; G06F 3/04845; G06F 3/04886; G06F 3/04803
See application file for complete search history.

(56) References Cited

U.S. PATENT DOCUMENTS

| | | | |
|---|---|---|---|
| 9,632,824 B2* | 4/2017 | Lyubinin | G06F 21/31 |
| 9,900,651 B2* | 2/2018 | Son | H04N 21/47202 |
| 2005/0235210 A1 | 10/2005 | Peskin et al. | |
| 2007/0136685 A1* | 6/2007 | Bhatla | G09G 5/14 |
| | | | 715/800 |
| 2008/0306886 A1* | 12/2008 | Otto | G06F 3/0481 |
| | | | 706/11 |
| 2011/0113354 A1* | 5/2011 | Thiyagarajan | G09G 5/14 |
| | | | 715/760 |
| 2011/0169749 A1 | 7/2011 | Ganey et al. | |
| 2015/0185998 A1 | 7/2015 | Xing et al. | |
| 2016/0188196 A1* | 6/2016 | Panchapakesan | G06F 3/04883 |
| | | | 715/716 |

FOREIGN PATENT DOCUMENTS

| | | |
|---|---|---|
| CN | 102622176 A | 8/2012 |
| CN | 103024156 A | 4/2013 |
| CN | 103294398 A | 9/2013 |
| CN | 103455234 A | 12/2013 |
| CN | 103488419 A | 1/2014 |
| CN | 103559041 A | 2/2014 |
| CN | 103581396 A | 2/2014 |
| CN | 103793093 A | 5/2014 |
| CN | 104035719 A | 9/2014 |
| CN | 104281393 A | 1/2015 |
| CN | 104808905 A | 7/2015 |

OTHER PUBLICATIONS

International Search Report and Written Opinion for Application No. PCT/CN2015/095538, dated Feb. 25, 2016, 9 Pages.
Second Office Action for Chinese Application No. 201510247527.9, dated Jan. 26, 2018, 10 Pages.

* cited by examiner

DISPLAY PROCESSING METHOD, DISPLAY PROCESSING APPARATUS AND ELECTRONIC DEVICE

CROSS-REFERENCE TO RELATED APPLICATIONS

This application is the U.S. national phase of PCT Application No. PCT/CN2015/095538 filed on Nov. 25, 2015, which claims priority to Chinese Patent Application No. 201510247527.9 filed on May 15, 2015, the disclosures of which are incorporated in their entirety by reference herein.

TECHNICAL FIELD

The disclosure relates to the field of displaying technology, and in particular, to a display processing method, a display processing apparatus and an electronic device.

BACKGROUND

At present, the touch technology, with its superior interactive performance, has been more widely used in teaching, meetings and other occasions, and more convenient human-computer interactive experience can be obtained through a touch operation. The large screen display gradually appears in people's vision in many commercial application occasions, such as publicity, show, presentation.

However, the control way of an electronic device with a large screen in the related art is not different from the traditional way, for which the problem of low efficiency of the touch operation exists.

SUMMARY

An object of embodiments of the disclosure is to provide a display processing method, a display processing apparatus and an electronic device, so that the user can conventionally touch and control a big screen, and can control other applications which do not occupy a focus without a switching operation.

In order to achieve the above objective, a display processing method is provided according to one embodiment of the disclosure, which is applied to an electronic device. The electronic device includes a display screen, a touch display region for realizing a touch function is arranged in a display region of the display screen, and the display processing method includes:

creating a secondary window in the touch display region, where the secondary window includes a first sub-window and a second sub-window;

acquiring source display content corresponding to a display object displayed currently on the display screen;

modifying the source display content according to a ratio of a size of the first sub-window to a size of the display screen, to obtain target display content to be mapped and displayed into the first sub-window;

selecting to-be-displayed touch buttons from a set of touch buttons, where the to-be-displayed touch buttons correspond to at least one target application, the target application is in a running state currently and does not occupy a focus; and displaying the target display content and the to-be-displayed touch buttons into the first sub-window and the second sub-window respectively, so that the user is capable of touching and controlling the display object according to the content displayed in the first sub-window, and touching and controlling the target application according to the touch buttons displayed in the second sub-window.

In the above-described display processing method, the secondary window is at a left lower or right lower of the display region of the display screen.

The above-described display processing method further includes:

judging whether a condition of closing the secondary window is met to acquire a first judging result; and closing the secondary window, in a case that the first judging result indicates that the condition of closing the secondary window is met.

In the above-described display processing method, it is judged that the condition of closing the secondary window is met, in a case that no touch operation of a user is detected in the predetermined period of time.

The above-described display processing method further includes:

judging whether a condition of restarting the secondary window is met to acquire a second judging result, after the secondary window is closed; and returning to the step of creating a secondary window in the touch display region, in a case that the second judging result indicates that the condition of restarting the secondary window is met.

In the above-described display processing method, it is judged that the condition of restarting the secondary window is met, in a case that the predetermined touch operation performed by the user in the touch region is detected.

In the above-described display processing method, the selecting to-be-displayed touch buttons from a set of touch buttons includes:

determining touch buttons corresponding to the target application in the set of touch buttons;

judging whether the number of the touch buttons corresponding to the target application is greater than a predetermined number threshold to obtain a third judging result; and selecting a predetermined number of touch buttons from the touch buttons corresponding to the target application to use as the to-be-displayed touch buttons according to predetermined selection criteria for the touch buttons, in a case that the third judging result indicates that the number of the touch buttons corresponding to the target application is greater than the predetermined threshold, or directly using the touch buttons corresponding to the target application as the to-be-displayed touch buttons in a case that the third judging result indicates that the number of the touch buttons corresponding to the target application is not greater than the predetermined threshold.

In the above-described display processing method, the predetermined selection criteria for the touch buttons include performing selection in an order from larger to smaller according to usage times of the touch buttons.

In order to achieve the above object, a display processing apparatus is further provided according to one embodiment of the disclosure, which is applied to an electronic device. The electronic device includes a display screen, a touch display region for realizing a touch function is arranged in a display region of the display screen, and the display processing apparatus includes:

a creating module, configured for creating a secondary window in the touch display region, where the secondary window includes a first sub-window and a second sub-window;

an acquiring module, configured for acquiring source display content corresponding to a display object displayed currently on the display screen;

a modifying module, configured for modifying the source display content according to a ratio of a size of the first sub-window to a size of the display screen, to obtain target display content to be mapped and displayed into the first sub-window;

a selecting module, configured for selecting to-be-displayed touch buttons from a set of touch buttons, where the to-be-displayed touch buttons correspond to at least one target application, the target application is in a running state currently and does not occupy a focus; and a display processing module, configured for displaying the target display content and the to-be-displayed touch buttons into the first sub-window and the second sub-window respectively, so that the user is capable of touching and controlling the display object according to the content displayed in the first sub-window, and touching and controlling the target application according to the touch buttons displayed in the second sub-window.

In the above-described display processing apparatus, the secondary window is arranged at a left lower or right lower of the display region of the display screen.

The above-described display processing apparatus further includes:

a first judging module, configured for judging whether a condition of closing the secondary window is met to acquire a first judging result; and a closing module, configured for closing the secondary window, in a case that the first judging result indicates that the condition of closing the secondary window is met.

In the above-described display processing apparatus, the first judging module is configured for judging that the condition of closing the secondary window is met, in a case that no touch operation of the user is detected in the predetermined period of time.

The above-described display processing apparatus further includes:

a second judging module, configured for judging whether a condition of restarting the secondary window is met to acquire a second judging result, after the secondary window is closed; and a restarting module, configured for restarting the creating module, in a case that the second judging result indicates that the condition of restarting the secondary window is met.

In the above-described display processing apparatus, the second judging module is configured for judging that the condition of restarting the secondary window is met, in a case that the predetermined touch operation performed by the user in the touch region is detected.

In the display processing apparatus, the selecting module includes:

a determining unit, configured for determining touch buttons corresponding to the target application in the set of touch buttons;

a judging unit, configured for judging whether the number of the touch buttons corresponding to the target application is greater than a predetermined number threshold to obtain a third judging result; and a selecting unit, configured for selecting a predetermined number of touch buttons from the touch buttons corresponding to the target application to use as the to-be-displayed touch buttons according to predetermined selection criteria for the touch buttons, in a case that the third judging result indicates that the number of the touch buttons corresponding to the target application is greater than the predetermined threshold, or directly using the touch buttons corresponding to the target application as the to-be-displayed touch buttons in a case that the third judging result indicates that the number of the touch buttons corresponding to the target application is not greater than the predetermined threshold.

In the above-described display processing apparatus, the predetermined selection criteria for the touch buttons include performing selection in an order from larger to smaller according to usage times of the touch buttons.

In order to achieve the above objective, an electronic device is further provided according to an embodiment of the disclosure. The electronic device includes a display screen, a touch display region for realizing a touch function is arranged in a display region of the display screen, and the electronic device further includes the display processing apparatus described above.

An electronic device is further provided according to an embodiment of the disclosure. The electronic device includes multiple display panels, at least one touch panel and a display processing apparatus, a display screen is spliced with the multiple display panels and the touch panel, and the touch panel is arranged on the lower of the display screen.

The display processing apparatus includes:

a creating module, configured for creating a secondary window in the touch display region, where the secondary window includes a first sub-window and a second sub-window;

an acquiring module, configured for acquiring source display content corresponding to a display object displayed currently on the display screen;

a modifying module, configured for modifying the source display content according to a ratio of a size of the first sub-window to a size of the display screen, to obtain target display content to be mapped and displayed into the first sub-window;

a selecting module, configured for selecting to-be-displayed touch buttons from a set of touch buttons, where the to-be-displayed touch buttons correspond to at least one target application, the target application is in a running state currently and does not occupy a focus; and a display processing module, configured for displaying the target display content and the to-be-displayed touch buttons into the first sub-window and the second sub-window respectively, so that the user is capable of touching and controlling the display object according to the content displayed in the first sub-window, and touching and controlling the target application according to the touch buttons displayed in the second sub-window.

The above-described electronic device further includes:

a first judging module, configured for judging whether a touch operation performed by the user on the touch panel is detected in a predetermined period of time to acquire a first judging result; and a closing module, configured for closing the secondary window, in a case that the first judging result indicates that no touch operation of the user is detected in the predetermined period of time.

The above-described electronic device further includes:

a second judging module, configured for judging whether a predetermined touch operation performed by the user on the touch panel is detected to acquire a second judging result, after the secondary window is closed; and a restarting module, configured for restarting the creating module, in a case that the second judging result indicates that the predetermined touch operation performed by the user on the touch panel is detected.

The embodiments of the disclosure at least have advantageous effects as follows.

For a larger display screen, the entire content displayed on the display screen is mapped in a small secondary window in the touch region, so that the user can touch and control the larger display screen through the small secondary window, thereby avoiding difficulties in the touch operation on the screen of a larger size, reducing the action region for the touch operation and improving the efficiency of interacting with the touch screen.

Meanwhile, a touch button corresponding to the application which is in a running state and does not occupy a focus is also displayed in another window at the same time, so that the user can control the other application without a switching operation, convenient for the user.

DETAILED DESCRIPTION

Figure 1:
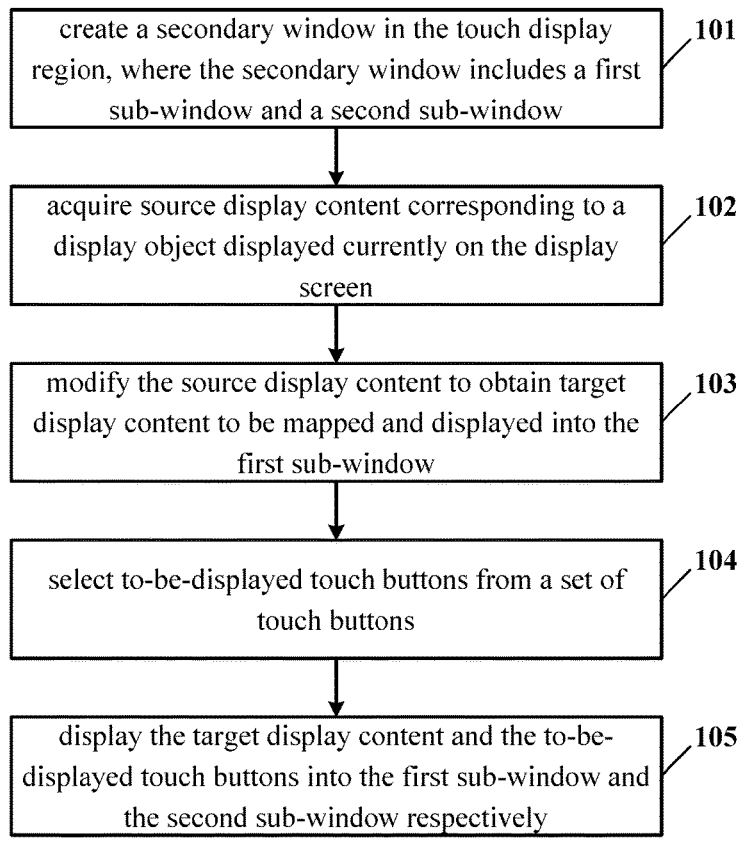
FIG. 1 is a schematic flowchart of a display processing method according to one embodiment of the disclosure.

A display processing method according to one embodiment of the disclosure may be applied to an electronic device which includes a display screen with a touch display region in a display region for realizing a touch function. As shown in FIG. 1, the display processing method includes the following steps.

Step 101 is to create a secondary window in the touch display region. The secondary window includes a first sub-window and a second sub-window.

Step 102 is to acquire source display content corresponding to a display object displayed currently on the display screen.

Step 103 is to modify the source display content according to a ratio of a size of the first sub-window to a size of the display screen, to obtain target display content to be mapped and displayed into the first sub-window.

Step 104 is to select to-be-displayed touch buttons from a set of touch buttons. the to-be-displayed touch buttons correspond to at least one target application. The target application is an application which is in a running state currently and does not occupy a focus.

Step 105 is to display the target display content and the to-be-displayed touch button into the first sub-window and the second sub-window respectively, so that the user is capable of touching and controlling the display object according to the content displayed in the first sub-window, and touching and controlling the target applications according to the touch buttons displayed in the second sub-window.

Firstly, it should be noted that the above-described steps 103 and 104 are not distinguished in sequence. In at least one embodiment of the disclosure, the target display content may be obtained firstly and then the to-be-displayed touch buttons may be obtained; the to-be-displayed touch buttons may be obtained firstly and then the target display content may be obtained; or the target display content and the to-be-displayed touch buttons may be obtained at the same time. The above step numbers do not represent the sequence relation in performing operations.

In at least one embodiment of the disclosure, for a larger display screen, the entire content displayed on the display screen is mapped in a small secondary window in the touch region, so that the user can touch and control the larger display screen through the small secondary window, thereby avoiding difficulties in the touch operation on the screen of a larger size, reducing the action region for the touch operation and improving the efficiency of interacting with the touch screen.

Meanwhile, a touch button corresponding to one application which is in a running state and does not occupy a focus is also displayed in another window at the same time, so that the user can control the other application without a switching operation, which is convenient for the user.

This is illustrated in more detail as follows.

Figure 2:
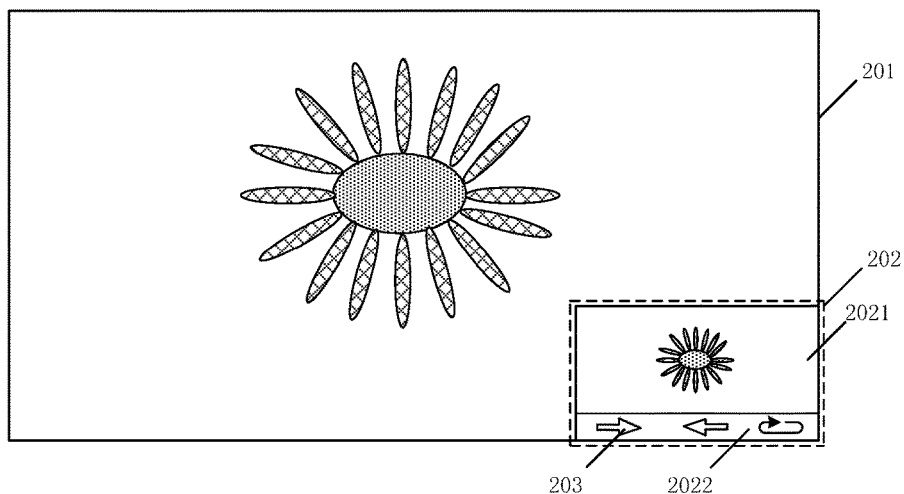
FIG. 2 is a schematic diagram of screen effects of a display processing method according to one embodiment of the disclosure.

As shown in FIG. 2, if a display screen 201 of a large size is arranged at a location higher than a user's hand reaching distance, it is difficult for the user to touch the top of the screen when the user performs a touch operation on the display screen 201. Moreover, there is an inconvenient problem in the related art due to the touch points corresponding to two adjacent touch operations being too far away from each other. Therefore, the efficiency of the touch operation is reduced.

Meanwhile, since a touch module is needed to be arranged on the entire screen, the manufacture difficulty and production cost for products are greatly increased.

Of course, it should be understood that the above-mentioned "screen of a large size" is a relative concept. With respect to the mobile phone, the screen more than 6 inches is very big and fingers cannot touch a region at the left upper corner, when the mobile phone is used with one hand.

As shown in FIG. 2, with the method according to the embodiment of the disclosure, firstly, a secondary window 202 including a first sub-window 2021 and a second sub-window 2022 in the touch display region may be created. The first sub-window 2021 is used to map and display the current display content of the display screen 201. The second sub-window 2022 is used to display multiple touch buttons 203.

When the user needs to perform a touch operation based on the content displayed on the display screen, the touch operation is performed in only the region where the first sub-window 2021 is located. Since the area of the first sub-window 2021 is much smaller than the area of the display screen 201, the inefficiencies of touch operation due to a large screen is no longer exists.

With the method according to the embodiment of the disclosure, only a small region is needed to arrange the touch module, which reduces the manufacture difficulty and production cost for products.

How to achieve the mapping and displaying belongs to the related art, which is not described in detail.

How to achieve the control of the entire screen in accordance with the touch operation performed on the first sub-window 2021 includes two parts as follows.

1. The first sub-window 2021 is touched and controlled based on the touch operation performed on the first sub-window 2021, which has no principal difference from the control and processing of the existing mobile phone with a touch screen.

2. The display content changed due to the touch operation on the first sub-window 2021 is inversely mapped onto the display screen. How to achieve the mapping and displaying belongs to the related art, which is not described in detail.

In at least one embodiment of the disclosure, the secondary window 202 includes not only the first sub-window 2021, but also the second sub-window 2022 for displaying the touch buttons 203. The touch buttons correspond to the applications which are in a running state currently and do not occupy the focus. When the user does not want to switch to the application to be touched, the user may perform a touch operation on the applications which are in a running state currently and do not occupy the focus by using the touch buttons arranged in the second sub-window 2022, which is greatly convenient to the user.

This is described with examples below.

Assumed that a web page is currently displayed on the screen, while the user opens a music playing application, but the music playing application runs in the background.

Assumed that only the first sub-window 2021 exists but the above second sub-window 2022 does not exist, if the user wants to control the music playing application, firstly, the music playing application running in the background is switched to be the music playing application running in the foreground and occupying the focus. The switched music playing application running in the foreground and occupying the focus is mapped and displayed in the first sub-window 2021, and then the user can perform the touch operation.

After the adjustment is completed, the user has to switch to an application for displaying a web page and continue to browse the web page.

As can be seen from the above description, the above-described process is extremely cumbersome, and inconvenient for the user.

With the method according to the embodiment of the disclosure, as shown in FIG. 2, the user can control the music playing application running in the background by performing a touch operation on the touch buttons 203 in the second sub-window 2022, such as playing the next one, loop playing, volume adjustment, while the user browses the web page.

It can be found that the above-described manner greatly facilitates the users.

As another example, a live chat client is opened in the background when the user watches a movie, but the user does not set a mechanism for handling messages.

Hence, during the user watches a movie or the projector file is presented in a full screen, the live chat client prompts the user when a message is received, thus interfering the user to watch a movie or lecture. In this case, the user may set an automatic replying message or set no notification when the message is received, directly via the touch buttons arranged in the second sub-window 2022, thereby avoiding the effect of live chat client on the user without interrupting the current viewed movie or lecture.

The above target applications are applications in the application level, the adjustment of the target applications may not affect other applications. But the above target applications may also be applications in the system level. The adjustment of the applications in the system level may affect the overall situation, or may affect other applications. For example, for an application of adjusting a sound card, the adjustment of the sound card may affect all applications which are needed to output sound. As another example, for an application of adjusting display brightness, the adjustment of brightness outputted by the display card may affect all application.

This is described with examples below.

When the user watches a movie, if the volume/brightness adjustment via software itself cannot meet the user's requirement, the user may adjust the volume outputted by the sound card/brightness outputted by the display card via buttons, without interrupting currently watching the movie.

In at least one embodiment of the present disclosure, a secondary window is needed to be set to map and display the display content and touch buttons on the display screen. In order to facilitate the user's operation and reduce the effect on the overall sense of the images displayed on the display screen as far as possible, as shown in FIG. 2, the secondary window is arranged at a left lower or right lower of the display region of the display screen.

In at least one embodiment of the present disclosure, the above-described secondary window may always exist. Even through the above-described secondary window is arranged at a left lower or right lower of the display region, the secondary window has inevitably effects on the content displayed on the display screen. Therefore, it is necessary to set a closing condition to trigger the secondary window to be closed automatically, thereby avoiding the effect of the secondary window being displayed for a long period of time on the image displayed on the display screen.

The display processing method according to the embodiment of the disclosure further includes: judging whether a condition of closing the secondary window is met to acquire a first judging result; and, closing the secondary window, in a case that the first judging result indicates that the condition of closing the secondary window is met.

In the embodiment of the disclosure, the condition of closing the secondary window may be set according to the user's requirement. One practicable implementation way is described as follows.

As previously mentioned, the setting of the secondary window is used to map the display content of the display screen into the first sub-window, so that the user can touch and control the display object based on the content displayed in the first sub-window. Therefore, when the user does not perform a touch operation in a long period of time, it may represent that the user has no requirement of the touch operation currently. In this case, if the first sub-window is still displayed, the wholeness of the display content of the display screen may be affected. In at least one embodiment of the disclosure, it is judged that the condition of closing the secondary window is met, in a case that no touch operation of the user is detected in a predetermined period of time.

In the display processing method, it is judged whether a touch operation of the user is detected in the predetermined period of time to acquire a first judging result; and the secondary window is closed in a case that the first judging result indicates that no touch operation of the user is detected in the predetermined period of time.

Of course, after the secondary window is closed, a way of restarting the secondary window convenient for the user may be further set. That is, in at least one embodiment of the disclosure, the display processing method further includes: judging whether a condition of restarting the secondary window is met to acquire a second judging result, after the secondary window is closed; and, returning to the step of creating a secondary window in the touch display region, in a case that the second judging result indicates that the condition of restarting the secondary window is met.

The above-described condition of restarting the secondary window may be set according to the user's requirement.

Through the above processing, the secondary window is closed when the user has no need to perform the touch operation, to avoid the effect of the secondary window on the wholeness of the display content of the display screen. When the user needs to perform the touch operation, the user may perform an operation such that the condition of restarting the secondary window is met, the secondary window is redisplayed, and the touch operation is performed in the secondary window.

In the display processing method, after the secondary window is closed, it is judged whether a predetermined touch operation performed by the user in the touch region is detected to acquire a second judging result; and the step of creating a secondary window in the touch display region is returned to, in a case that the second judging result indicates that the predetermined touch operation performed by the user in the touch region is detected.

The above-described process greatly facilitates the user.

In a convenient implementation way, the user may perform the predetermined touch operation in the touch region to trigger the restarting of the secondary window. That is, it is judged that the condition of restarting the secondary window is met, in a case that the predetermined touch operation performed by the user in the touch region is detected.

In at least one embodiment of the disclosure, one or more common touch buttons may be set for one application. For example, a touch button for adjusting volume, a touch button for selecting a song to be played, a touch button for adjusting a playing speed and the like may be set for a music playing application. As another example, a touch button for adjusting volume, a touch button for adjusting a playing speed, a touch button for selecting a playing scene and the like may be set for a video playing application.

Thus, when the user opens multiple applications, more applications run in the background and do not occupy the focus, that is, the number of the above-described target applications becomes more. Finally more to-be-displayed touch buttons may be displayed in the second sub-window due to the more target applications.

However, in order to not affect the overall display, a size of the second sub-window is limited, small display space may be assigned for one button, if the number of the touch buttons is more. Small touch buttons are inconvenient for the user in the touch operation.

In at least one embodiment of the disclosure, a selection operation is performed when the number of touch buttons corresponding to the target applications is more, to control the number of the touch buttons finally displayed in the second sub-window to be in a quantitative range, so that each touch button can occupy display space suitable for the user operation, convenient for the user.

Therefore, in at least one embodiment of the disclosure, the selecting to-be-displayed touch buttons from a set of touch buttons includes:

determining touch buttons corresponding to the target application in the set of touch buttons;

judging whether the number of the touch buttons corresponding to the target application is greater than a predetermined number threshold to obtain a third judging result; and, selecting a predetermined number of touch buttons from the touch buttons corresponding to the target application to use as the to-be-displayed touch buttons according to predetermined selection criteria for the touch buttons, in a case that the third judging result indicates that the number of the touch buttons corresponding to the target application is greater than the predetermined threshold, or directly using the touch buttons corresponding to the target application as the to-be-displayed touch buttons in a case that the third judging result indicates that the number of the touch buttons corresponding to the target application is not greater than the predetermined threshold.

Through the above processing, each of the touch buttons finally displayed in the second sub-window can occupy suitable display space, thereby being convenient for the user in identifying the touch buttons and performing the touch operations on the touch buttons.

How to select the touch buttons may be set according to the user's requirement. For example, if the finger of the user is smaller, more touch buttons may be selected; if the finger of the user is larger, less touch buttons may be selected.

As another example, less touch buttons may be selected to present larger touch buttons for the elderly having poor identification ability or children having poor body control ability.

As yet another example, a selection operation is performed based on the historical statistic data, and the probability of performing a touch operation by the user to switch applications is reduced statistically.

In statistical terms, if the user operates the touch button corresponding to the music playing application 100 times while the user operates the touch button corresponding to the live chat application only 10 times, when both the music playing application and the live chat application run in the background, the touch button corresponding to the music playing application should be selected preferentially, since the user has more requirements on the music playing application.

For one application, if the user operates the touch button for adjusting volume corresponding to the music playing application 100 times while the user operates the touch button for selecting a song corresponding to the music playing application only 10 times, the touch button for adjusting volume corresponding to the music playing application should be selected preferentially, since the user has more requirements on volume adjustment.

Therefore, in at least one embodiment of the disclosure, the predetermined selection criteria for the touch buttons include performing selection in an order from larger to smaller according to usage times of the touch buttons, thereby greatly reducing the probability of performing a touch operation by the user to switch applications.

Figure 3:
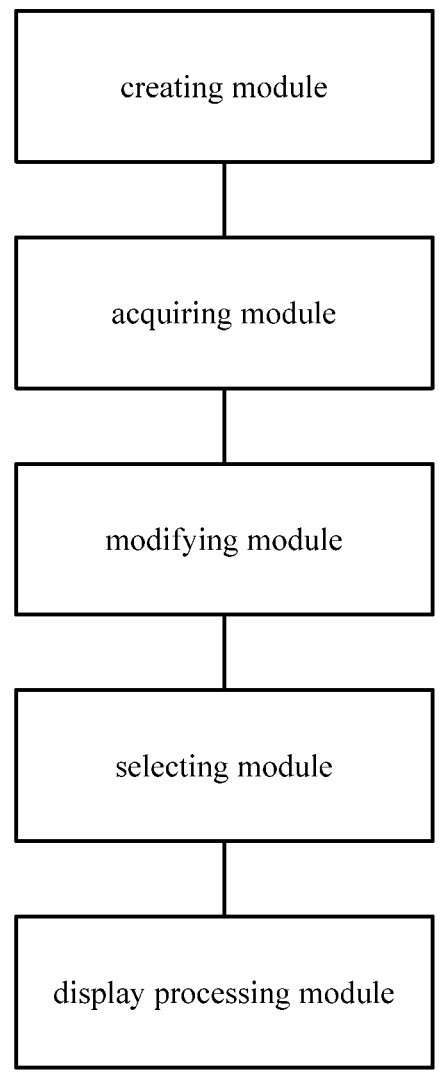
FIG. 3 is a schematic diagram of a display processing apparatus according to one embodiment of the disclosure.

A display processing apparatus is further provided according to one embodiment of the disclosure, which is applied to an electronic device. The electronic device includes a display screen, and a touch display region for realizing a touch function is arranged in a display region of the display screen. As shown in FIG. 3, the display processing apparatus includes:

a creating module, configured for creating a secondary window in the touch display region, where the secondary window includes a first sub-window and a second sub-window;

an acquiring module, configured for acquiring source display content corresponding to a display object displayed currently on the display screen;

a modifying module, configured for modifying the source display content according to a ratio of a size of the first sub-window to a size of the display screen, to obtain target display content to be mapped and displayed into the first sub-window;

a selecting module, configured for selecting to-be-displayed touch buttons from a set of touch buttons, where the to-be-displayed touch buttons correspond to at least one target application, the target application is an application which is in a running state currently and does not occupy a focus; and a display processing module, configured for displaying the target display content and the to-be-displayed touch buttons into the first sub-window and the second sub-window respectively, so that the user is capable of touching and controlling the display object according to the content displayed in the first sub-window, and touching and controlling the target application according to the touch buttons displayed in the second sub-window.

In the above-described display processing apparatus, the secondary window is arranged at a left lower or right lower of the display region of the display screen.

The above-described display processing apparatus further includes:

a first judging module, configured for judging whether a condition of closing the secondary window is met to acquire a first judging result; and a closing module, configured for closing the secondary window, in a case that the first judging result indicates that the condition of closing the secondary window is met.

In the above-described display processing apparatus, the first judging module is configured for judging that the condition of closing the secondary window is met, in a case that no touch operation of the user is detected in the predetermined period of time.

That is, the first judging module is configured for judging whether a touch operation of the user is detected in a predetermined period of time to acquire a first judging result.

The closing module is configured for closing the secondary window, in a case that the first judging result indicates that no touch operation of the user is detected in the predetermined period of time.

The above-described display processing apparatus further includes:

a second judging module, configured for judging whether a condition of restarting the secondary window is met to acquire a second judging result, after the secondary window is closed; and a restarting module, configured for restarting the creating module, in a case that the second judging result indicates that the condition of restarting the secondary window is met.

In the above-described display processing apparatus, the second judging module is configured for judging that the condition of restarting the secondary window is met, in a case that the predetermined touch operation performed by the user in the touch region is detected.

That is, the second judging module is configured for judging whether the predetermined touch operation performed by the user in the touch region is detected to acquire a second judging result, after the secondary window is closed.

The restarting module is configured for restarting the creating module, in a case that the second judging result indicates that the predetermined touch operation performed by the user in the touch region is detected.

In the display processing apparatus, the selecting module includes:

a determining unit, configured for determining touch buttons corresponding to the target application in the set of touch buttons;

a judging unit, configured for judging whether the number of the touch buttons corresponding to the target application is greater than a predetermined number threshold to obtain a third judging result; and a selecting unit, configured for selecting a predetermined number of touch buttons from the touch buttons corresponding to the target application to use as the to-be-displayed touch buttons according to predetermined selection criteria for the touch buttons, in a case that the third judging result indicates that the number of the touch buttons corresponding to the target application is greater than the predetermined threshold, or directly using the touch buttons corresponding to the target application as the to-be-displayed touch buttons in a case that the third judging result indicates that the number of the touch buttons corresponding to the target application is not greater than the predetermined threshold.

In the above-described display processing apparatus, the predetermined selection criteria for the touch buttons include performing selection in an order from larger to smaller according to usage times of the touch buttons.

In order to achieve the above objective, an electronic device is further provided according to one embodiment of the disclosure. The electronic device includes a display screen, a touch display region for realizing a touch function is arranged in a display region of the display screen. The electronic device further includes the display processing apparatus described above.

Figure 4:
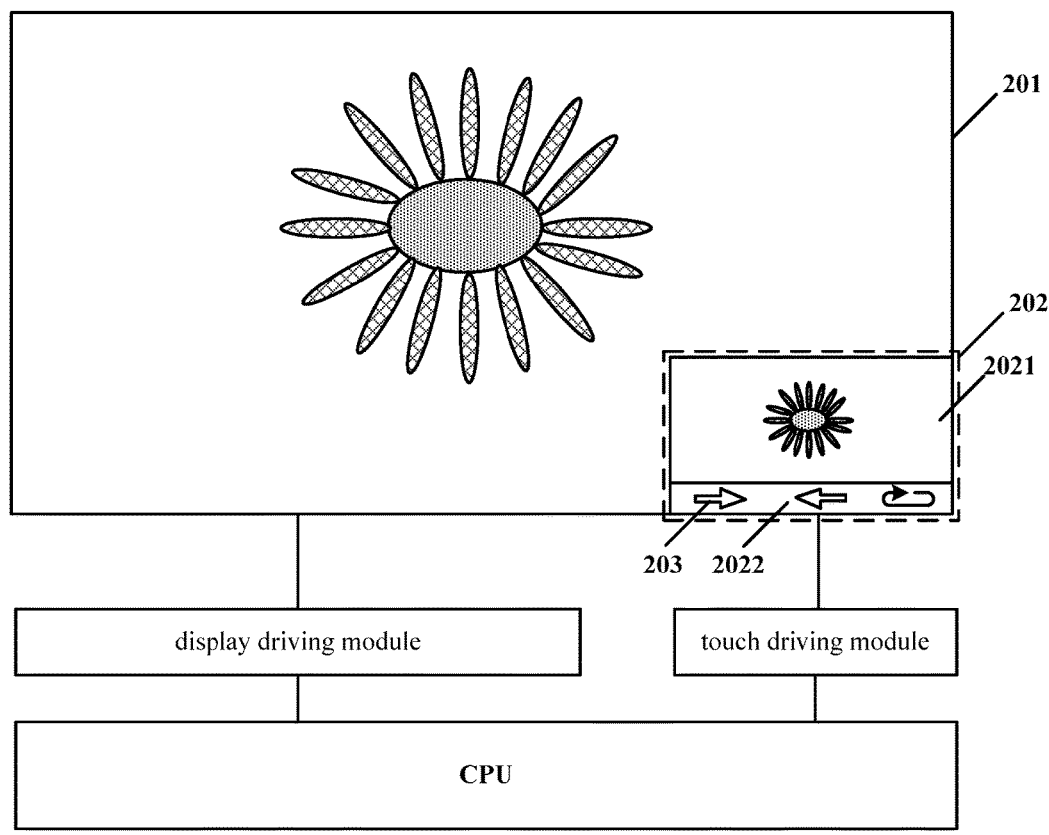
FIG. 4 is a schematic diagram of an electronic device according to one embodiment of the disclosure.

As shown in FIG. 4, a structure of an electronic device includes several parts as follows: a central processing unit, a display driving module, a touch driving module and a display screen.

The central processing unit controls the display driving module and the touch driving module, to provide the necessary function support which includes:

turning on a touch function in the secondary window 202, copying the display content of the display screen and mapping the display content into the first sub-window 2021 via the display driving module;

generating a corresponding instruction to control an application when the touch operation is detected via the touch driving module;

changing the display content in the first sub-window 2021 via the display driving module according to a response of the application to the instruction;

mapping the changed display content in the first sub-window 2021 into the display screen 201 via the display driving module;

closing the secondary window 202 via the display driving module in a case that no touch detection signal is received from the touch driving module in a predetermined period of time.

The above functions are not exhaustive, and any above-mentioned processing may be achieved through the configuration shown in FIG. 4, which is not exemplified herein.

The display devices may be a variety of electronic devices with large screens, for example, any products or components having a display function, such as a mobile phone, a tablet computer, a television, a monitor, a notebook computer, a digital picture frame, a navigating instrument.

Figure 5:
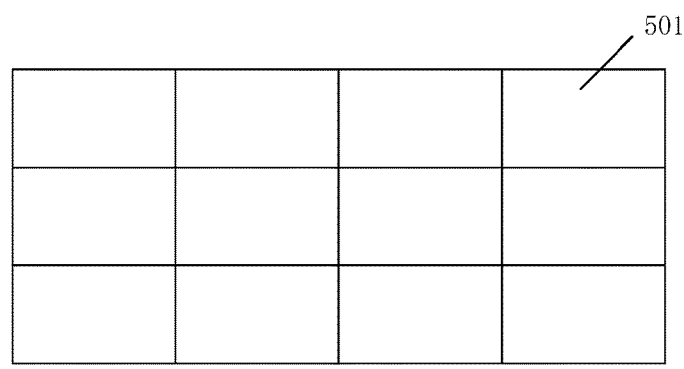
FIG. 5 is a schematic diagram of a spliced product according to one embodiment of the disclosure.

The display device according to the embodiment of the disclosure may also be a spliced product with a larger size, as shown in FIG. 5. In this way, the display device includes multiple splices 501, the splice at the right lower corner is a touch panel and other splices are display panels.

Many function components described in this specification are called modules, in order to more particularly emphasize the independence of their implementation ways.

In at least one embodiment of the present disclosure, the modules may be implemented in software, so that the modules are executed by various types of processors. For example, an identified executable code module may be one or more physical or logical blocks including computer instructions. For example, the executable code module may be constructed as an object, procedure, or function. Nevertheless, the identified executable code modules need not be physically located together, but may include different instructions stored in different physical locations. When these instructions are logically combined together, the module is constituted and the specified purpose of the module is achieved.

In fact, the executable code module may be a single instruction or many instructions, and may even be distributed over several different code segments, be distributed in different programs, and be distributed across multiple storage devices. Similarly, operational data may be identified within the module, may be implemented in any suitable form and be organized within any suitable type of data structure. The operational data may be collected as a single data set, or may be distributed at different locations (including be distributed on different storage devices), and at least a part of the operational data can exist only as electronic signals on a system or network.

When the module can be implemented in software, considering the current level of hardware technology, those skilled in the art can configure a corresponding hardware circuit to achieve a corresponding function for the module implemented in software, regardless of the cost. The hardware circuit includes a common very large scale integrated (VLSI) circuit, a gate array, and the conventional semiconductor or other discrete components such as a logic chip and a transistor. The module may also be implemented with programmable hardware devices such as a field programmable gate array, a programmable logic array, a programmable logic device.

In the methods according to the embodiments of the disclosure, the number of the steps cannot be used to define the sequence of the steps, and the steps in a changed sequence still fall into the scope of protection of the present disclosure without creative efforts for those ordinary skilled the art.

It is apparent to those skilled in the art that various changes and modifications may be made to the disclosure without departing from the spirit and scope of the disclosure. In this way, provided that these changes and modifications of the disclosure belong to the scope of the claims and equivalent techniques of the disclosure, the disclosure also intends to include these changes and modifications.

What is claimed is:

1. A display processing method applied to an electronic device which comprises a display screen with a touch display region in a display region for realizing a touch function, wherein the touch display region is a part of the display region, the display processing method comprising:
   displaying a display object in the display region of the display screen;
   creating a secondary window in the touch display region, wherein the secondary window comprises a first sub-window and a second sub-window;
   acquiring source display content corresponding to the display object displayed currently on the display screen;
   generating target display content to be mapped and displayed in the first sub-window by modifying the source display content according to a ratio of a size of the first sub-window to a size of the display screen;
   selecting to-be-displayed touch buttons from a set of touch buttons, wherein the to-be-displayed touch buttons correspond to a target application, and wherein the target application is a background-running application among a number of different categories of background-running-applications, and wherein each of the background applications runs without occupying a focus by being behind a foreground-running application running on top; and
   displaying the target display content and the to-be-displayed touch buttons into the first sub-window and the second sub-window respectively, to enable a user to touch and control the display object displayed currently on the display screen according to the content displayed in the first sub-window, and touch and control the target application according to the touch buttons displayed in the second sub-window; wherein
   the target display content of the first sub-window comprises: mapping and displaying an entire content displayed on the display screen in accordance with the ratio of the size of the first sub-window to the size of the display screen, and mapping and displaying a content of at least one background-running application; and
   wherein the touch buttons displayed in the second sub-window are adjusted based on the different categories and the number of corresponding background-running applications.

2. The display processing method according to claim 1, further comprising:
   judging whether a touch operation of the user is detected in a predetermined period of time to acquire a first judging result; and
   closing the secondary window, in a case that the first judging result indicates that no touch operation of the user is detected in the predetermined period of time.

3. The display processing method according to claim 2, further comprising:
   judging whether a predetermined touch operation performed by the user in the touch region is detected to acquire a second judging result, after the secondary window is closed; and
   returning to the step of creating a secondary window in the touch display region, in a case that the second judging result indicates that the predetermined touch operation performed by the user in the touch region is detected.

4. The display processing method according to claim 1, wherein the selecting to-be-displayed touch buttons from a set of touch buttons comprises:
   determining touch buttons corresponding to the target application in the set of touch buttons;
   judging whether the number of the touch buttons corresponding to the target application is greater than a predetermined number threshold to obtain a third judging result; and
   selecting a predetermined number of touch buttons from the touch buttons corresponding to the target application to use as the to-be-displayed touch buttons according to predetermined selection criteria for the touch buttons, in a case that the third judging result indicates that the number of the touch buttons corresponding to the target application is greater than the predetermined threshold, or directly using the touch buttons corresponding to the target application as the to-be-displayed touch buttons in a case that the third judging result indicates that the number of the touch buttons corresponding to the target application is not greater than the predetermined threshold.

5. The display processing method according to claim 4, wherein the predetermined selection criteria for the touch buttons comprises: performing selection in an order from larger to smaller according to usage times of the touch buttons.

6. A display processing apparatus for use with an electronic device which comprises a display screen with a touch display region in a display region for realizing a touch function, wherein the touch display region is a part of the display region, the display processing apparatus comprising:
a displaying module, configured for displaying a display object in the display region of the display screen;
a creating module, configured for creating a secondary window in the touch display region, wherein the secondary window comprises a first sub-window and a second sub-window;
an acquiring module, configured for acquiring source display content corresponding to the display object when the display object is displayed on the display screen;
a generating module, configured for generating target display content to be mapped and displayed in the first sub-window by modifying the source display content according to a ratio of a size of the first sub-window to a size of the display screen;
a selecting module, configured for selecting to-be-displayed touch buttons from a set of touch buttons, wherein the to-be-displayed touch buttons correspond to a target application when the target application is a background-running application among a number of different categories of background-running applications, and wherein each of the background applications runs without occupying a focus by being behind a foreground-running application running on top; and
a display processing module, configured for displaying the target display content and the to-be-displayed touch buttons into the first sub-window and the second sub-window respectively, to enable a user to touch and control the display object when the display object is displayed on the display screen according to the content displayed in the first sub-window, and touch and control the target application according to the touch buttons displayed in the second sub-window, wherein
the target display content of the first sub-window comprises: mapping and displaying an entire content displayed on the display screen in accordance with the ratio of the size of the first sub-window to the size of the display screen, and mapping and displaying a content of at least one background-running application; and
wherein the touch buttons displayed in the second sub-window are adjusted based on the different categories and the number of corresponding background-running applications.

7. The display processing apparatus according to claim 6, further comprising:
a first judging module, configured for judging whether a touch operation of the user is detected in a predetermined period of time to acquire a first judging result; and
a closing module, configured for closing the secondary window, in a case that the first judging result indicates that no touch operation of the user is detected in the predetermined period of time.

8. The display processing apparatus according to claim 7, further comprising:
a second judging module, configured for judging whether a predetermined touch operation performed by the user in the touch region is detected to acquire a second judging result, after the secondary window is closed; and
a restarting module, configured for restarting the creating module, in a case that the second judging result indicates that the predetermined touch operation performed by the user in the touch region is detected.

9. The display processing apparatus according to claim 6, wherein the selecting module comprises:
a determining unit, configured for determining touch buttons corresponding to the target application in the set of touch buttons;
a judging unit, configured for judging whether the number of the touch buttons corresponding to the target application is greater than a predetermined number threshold to obtain a third judging result; and
a selecting unit, configured for selecting a predetermined number of touch buttons from the touch buttons corresponding to the target application to use as the to-be-displayed touch buttons according to predetermined selection criteria for the touch buttons, in a case that the third judging result indicates that the number of the touch buttons corresponding to the target application is greater than the predetermined threshold, or directly using the touch buttons corresponding to the target application as the to-be-displayed touch buttons in a case that the third judging result indicates that the number of the touch buttons corresponding to the target application is not greater than the predetermined threshold.

10. An electronic device comprising: a display screen, wherein a touch display region for realizing a touch function is in a display region of the display screen, and the electronic device further comprises the display processing apparatus according to claim 6.

11. An electronic device, comprising:
a plurality of display panels, at least one touch panel and a display processing apparatus, wherein the plurality of display panels and the touch panel are spliced to define a display screen, and the touch panel is at a lower of the display screen, wherein the touch panel is a part of the display screen; and
the display processing apparatus comprises:
a displaying module, configured for displaying a display object in the display region of the display screen;
a creating module, configured for creating a secondary window in the touch display region, wherein the secondary window comprises a first sub-window and a second sub-window;
an acquiring module, configured for acquiring source display content corresponding to the display object when the display object is displayed on the display screen;
a generating module, configured for generating target display content to be mapped and displayed in the first sub-window by modifying the source display content according to a ratio of a size of the first sub-window to a size of the display screen;
a selecting module, configured for selecting to-be-displayed touch buttons from a set of touch buttons, wherein the to-be-displayed touch buttons correspond to a target application when the target application is a background-running application among a number of different categories of background-running applications, and wherein each of the background applications runs without occupying a focus by being behind a foreground-running application running on top; and a display processing module, configured for displaying the target display content and the to-be-displayed touch buttons into the first sub-window and the second sub-window respectively, to enable a user to touch and control the display object when the display object is displayed on the display screen according to the content displayed in the first sub-window, and touch and control the target application according to the touch buttons displayed in the second sub-window; wherein the target display content of the first sub-window comprises: mapping and displaying an entire content displayed on the display screen in accordance with the ratio of the size of the first sub-window to the size of the display screen, and mapping and displaying a content of at least one background-running application; and wherein the number of the touch buttons displayed in the second sub-window are adjusted based on the different categories and the number of corresponding background-running applications.

12. The electronic device according to claim 11, further comprising:

a first judging module, configured for judging whether a touch operation performed by the user on the touch panel is detected in a predetermined period of time to acquire a first judging result; and a closing module, configured for closing the secondary window, in a case that the first judging result indicates that no touch operation of the user is detected in the predetermined period of time.

13. The electronic device according to claim 12, further comprising:

a second judging module, configured for judging whether a predetermined touch operation performed by the user on the touch panel is detected to acquire a second judging result, after the secondary window is closed; and a restarting module, configured for restarting the creating module, in a case that the second judging result indicates that the predetermined touch operation performed by the user on the touch panel is detected.

* * * * *